Patented Mar. 2, 1948

2,436,967

UNITED STATES PATENT OFFICE 2,436,967

POLYMERIZATION OF SUGARS

Gerald J. Leuck, Brooklyn, N. Y., assignor to Corn Products Refining Company, New York, N. Y., a corporation of New Jersey No Drawing. Original application April 1, 1942, Serial No. 437,273. Divided and this application April 26, 1945, Serial No. 590,499

13 Claims. (Cl. 260—209)

This invention relates to the polymerization of sugar by heat treatment of the sugar, preferably in a molten state, in the presence of a suitable catalyst or combination of catalysts; and the primary object of the invention is the production by processes of this type (i. e. involving treatment of the sugar in a molten state), of polymerized sugar products which (1) will contain relatively large amounts of polymerized sugar, in comparison with similar products produced heretofore; (2) in which a high degree of polymerization is obtained, that is, in which the polymers are made up of a large number of monosaccharide units; and (3) in which color formation is reduced to minimum. This application is a division of application Serial No. 437,273, filed April 1, 1942, now matured into U. S. Patent No. 2,387,275, issued October 23, 1945.

The invention contemplates the polymerization of any of the sugars, and whether in a pure state or not; although naturally a pure sugar must be used if a product as free as possible from non-sugar substances is desired. For example, alpha anhydrous dextrose, beta anhydrous dextrose, alpha hydrate dextrose, dehydrated hydrate dextrose, maltose, levulose, xylose and sucrose may be polymerized in accordance with the present invention.

The invention is concerned more particularly with the polymerization of dextrose although, as stated, other sugars may be treated in accordance with the invention.

Preferably, the sugars treated, as well as the catalysts employed, are in an anhydrous state, containing, so far as possible, neither free nor molecular water; and the polymerization procedure is carried on in such manner as to eliminate as quickly as may be, any water produced by the polymerizing reaction. That is to say, the process is, so far as possible, carried on under anhydrous conditions, for the reason that the presence of water tends to bring about depolymerization of the polymers as they are formed. Polymerization and depolymerization are reversible equilibrium reactions taking place simultaneously, so far as conditions are favorable, as is exemplified in the conversion of starch to dextrose, in which, along with the primary depolymerization of the starch, a polymerization of dextrose to higher molecular weight sugars takes place to a greater or less extent.

No claim is made herein, specifically, to a polymerization process in which the sugar (for example, anhydrous dextrose, dextrose hydrate or maltose) is polymerized without being reduced to a molten state, as such inventions are disclosed and claimed in copending application of Gerald J. Leuck, filed February 9, 1942, Serial No. 430,162, now matured into U. S. Patent No. 2,375,564, issued May 8, 1945 and division thereof, Serial No. 550,382, filed August 21, 1944 now U. S. Patent 2,400,423.

Reductions to practice of the present invention will be given below in the form of specific examples. It will be understood that these examples are purely typical and illustrative and that the invention is not to be considered as limited to the particular operating data given therein. It is the intention to cover all equivalents, as well as all modifications within the scope of the hereto appended claims.

The term "hexose units" as used herein, means actually, units of carbohydrate material having the generic formula $C_6H_{10}O_5$ including dextrose anhydrides, such as glucosans. It will be realized, however, that there are many other $C_6H_{10}O_5$ compounds of varying configuration, all of which fall within the generic dextrose anhydride group. That is, the polymerization of dextrose involves the elimination of one molecule of water from the anhydrous dextrose treated, as well as the building up of the dextrose anhydride units into polymers of varying degrees of polymerization. It should be observed, however, that during the polymerizing operation the dextrose anhydride units may undergo various transformations into $C_6H_{10}O_5$ configurations; and the term "dextrose polymers" as used herein, is intended to cover all such configurations. It should also be remarked that the polymers produced in accordance with this invention need not consist of single $C_6H_{10}O_5$ molecules. They may consist of two or more such molecules combined as glycosides. By "dextrose polymers" is intended the product, whatever its chemical nature, which results from the polymerizing operation, including essential changes and other reactions that may take place incidentally to the polymerizing operation, and also including the alteration of the dextrose anhydride configuration.

A similar meaning is to be given to the broader term "monosaccharide units" which can be regarded as composing the polymers of any sugar, whether consisting or not of dextrose molecules. For example, xylose is a monosaccharide having the generic formula $C_5H_{10}O_5$. A polymer made from xylose will consist of xylose anhydride units having the generic formula $C_5H_8O_4$ or some variation in configuration similar to that discussed for dextrose anhydride.

The products of this invention are heterogeneous mixtures of polymers having a wide variation in degree of polymerization.

In the examples proportions of ingredients are by weight and ranges are practical not critical unless otherwise specified.

Following some of the specific examples are data, the result of analyses (by what is termed herein the isopropyl alcohol method) indicating the amount and degree of polymerization of the product in each case. Before setting down the specific examples an explanation will be given of the method of analysis used.

METHOD OF DETERMINING AMOUNT AND DEGREE OF POLYMERIZATION

A 13.3% dextrose polymer solution is made by adding distilled water to the polymer. 15 cc. of this water polymer solution, in which the dry substance is equivalent to 2 grams of the original sugar dry substance, is used for making the test. To this 15 cc. polymer solution there is added, in three stages, anhydrous isopropyl alcohol, and the precipitates are removed after each addition of the alcohol. At the first stage 20 cc. of alcohol is added to the 15 cc. polymer water solution. At the second stage 15 cc. of alcohol is added so that the alcohol content of the solution at this stage is 35 cc. At the third stage 50 cc. of alcohol is added so that the alcohol content of the solution is 85 cc. The precipitated substances, at all stages, are monosaccharide polymers but of different degrees, on the average, of polymerization. The isopropyl alcohol test is based on the fact that dextrose is completely soluble in aqueous isopropyl alcohol as well as in water, whereas the dextrose polymers, which are soluble in water, are insoluble in aqueous isopropyl alcohol; and this insolubility depends (1) upon the alcohol content of the solution, the more concentrated the solution the greater the insolubility of the polymer; and (2) upon the degree of polymerization of the polymer, namely, the higher the degree of polymerization, that is, the greater the number of dextrose units in the polymer, the greater the insolubility of the polymer in a water-isopropyl alcohol solution of a given alcohol concentration. If no precipitate is obtained in the 85 cc. aqueous isopropyl alcohol solution, the assumption is that no polymerization has taken place and the sugar is still all there in its original form; or possibly, that the material consists mostly of sugar but with a small amount of polymer; or, it may be, that the material consists entirely of polymer products but of a low degree of polymerization. In any case there is no substantial formation of polymers in the sense of the present invention which aims at substantial amounts and degrees of polymerization. If the polymerization has taken place to the extent that precipitates occur in all three alcoholic portions, then the greater the percent of sugar polymer precipitated in the 20 cc. isopropyl alcohol portion, the greater the degree of polymerization of the precipitated polymer.

When the 15 cc. polymer solution is treated with isopropyl alcohol, the polymer is precipitated in the form of an emulsion or very fine dispersion which ordinarily cannot be filtered but is best centrifuged. Each centrifuging operation gives a light upper layer of isopropyl alcohol containing the original sugar and such polymer as does not precipitate at the particular alcohol concentration, and a heavy lower layer of the precipitated polymer. The heavy layer is evaporated to constant weight and the ratio of this to the total dry substance weight of the specimen treated represents the precent precipitated at this particular stage.

The degree of polymerization, at each stage, is made by a recognized molecular weight determination based upon the extent to which the freezing point of a 10% or 20% aqueous solution of these polymers is lowered. By ascertaining the molecular weight of the polymer, that is the mathematical average of the molecular weights of the various polymers formed, one can compute the number of dextrose units in the polymer or the mathematical average of the numbers of such units. In the case of a dextrose polymer, since the molecular weight of the dextrose is 180 and the molecular weight of water is 18, the dextrose unit in the dextrose polymer has a molecular weight of 162. From this it follows that by first subtracting 180 from the total molecular weight of a dextrose polymer and then dividing the difference by 162, the number of dextrose units will equal 1 plus the quotient. Similar determinations of the amounts and degrees of polymerization may be made in respect to sugar polymers other than dextrose polymers. However, the figures will be relative to the particular sugar polymerized.

EXAMPLE 1.—DEXTROSE: HYDROCHLORIC ACID: SUPERHEATED STEAM

Dehydrated hydrogen chloride gas is incorporated with alpha anhydrous dextrose until the dextrose contains, probably by adsorption, 0.015% (0.001% to 0.1%) of the gas. The material is spread on trays and treated for six hours in an oven which is kept at 150° C. (302° F.). Superheated steam at a temperature of about 150° C. (302° F.) is passed continuously through the oven, filling the same at all times during the operation. In this example the humidity was the maximum possible for the specified temperature and atmospheric pressure, that is, a relative humidity of 20%. By "relative humidity of 20%" is meant that a given volume of space contains, at atmospheric pressure, 20% of the amount of vapor which the same volume of space would contain under conditions of saturation at the same temperature; saturation at a temperature of 150° C. (302° F.) could obtain only at a pressure substantially in excess of atmospheric. Lower relative humidities might be employed.

The amount and degree of polymerization of the product of this example is indicated by the table below which gives the results of the isopropyl alcohol method of analysis.

Table 1.—Dextrose: hydrochloric acid: superheated steam

| Isopropyl Alcohol Added to 15 cc. Polymer Solution to Give Alcohol Contents of— | Per cent Dextrose Polymer Precipitated on Total Dry Substance in Sample | Degree of Polymerization Indicated by Number of Dextrose Units |
|---|---|---|
| Cc. | Per cent | |
| 20 | 5 | 7.0 |
| 35 | 43 | 4.2 |
| 85 | 24 | 3.1 |
| | 72 | |

In an experimental run where the conditions were the same except that the polymerizing operation was not carried on under an atmosphere of superheated steam but with a heated air circulation, at a temperature of 150° C., to carry off water vapor and effect polymerization, the amount and degree of polymerization were considerably smaller as indicated by the following table:

Table 1-a.—Dextrose: hydrochloric acid: heated air

| Isopropyl Alcohol Added to 15 cc. Polymer Solution to Give Alcohol Content of— | Per cent Dextrose Polymer Precipitated on Total Dry Substance in Sample | Degree of Polymerization Indicated by Number of Dextrose Units |
|---|---|---|
| Cc. | Per cent | |
| 20 | 0 | 0 |
| 35 | 15 | 3.7 |
| 85 | 45 | 2.9 |
| | — | |
| | 60 | |

The improvement resulting from the use of superheated steam as a catalyzer or accelerator of catalytic action is not in contradiction to the statement made above that the polymerising procedure should be, so far as possible, under anhydrous conditions. By this statement is meant, merely that the water, if present, should not be in such a state as to be capable of dissolving the dextrose. In the form of superheated steam the water is incapable of dissolving the dextrose, hence the process of polymerization takes place (so far as the superheated steam is concerned) under anhydrous conditions. In fact, since superheated steam has a strong affinity for water, its presence in the oven assists in removing from the material any water that it may contain.

That superheated steam has a specific catalytic effect in the polymerization process would seem to be evidenced by the fact that when dextrose is polymerized in one experiment by heat alone, in an atmosphere of heated air, and in another experiment is treated in the same way except that it is under an atmosphere of superheated steam, the amount and degree of polymerization in the second of these experiments are greater than the amount and degree of polymerization in the first experiment, as shown in the tables below:

Table 1-b.—Heated air: without acid

| Isopropyl Alcohol Added to 15 cc. Polymer Solution to Give Alcohol Contents of— | Per cent Dextrose Polymer Precipitated on Total Dry Substance in Sample | Degree of Polymerization Indicated by Number of Dextrose Units |
|---|---|---|
| Cc. | Per cent | |
| 20 | 0 | 0 |
| 35 | 0 | 0 |
| 85 | 11 | 2.9 |

Table 1-c.—Superheated steam: without acid

| Isopropyl Alcohol Added to 15 cc. Polymer Solution to Give Alcohol Contents of— | Per cent Dextrose Polymer Precipitated on Total Dry Substance in Sample | Degree of Polymerization Indicated by Number of Dextrose Units |
|---|---|---|
| Cc. | Per cent | |
| 20 | 0 | 0 |
| 35 | 25 | 4.0 |
| 85 | 20 | 3.0 |
| | — | |
| | 45 | |

Referring again to the process of the present invention, the polymerizing temperature employed must be above the melting point of the sugar to be polymerized, which, for alpha anhydrous dextrose is 146° C. (295° F.), and below the temperature at which the molten sugar chars and darkens to such an extent that the resulting products would be of little value from a commercial standpoint. This maximum practical or operating temperature is about 180° C. (356° F.).

The time of treatment is also a factor in producing color. One hour for melting the sugar and five hours for polymerization are as long periods as are practical from the point of view of color. If color is of no moment, the polymerization period may be lengthened.

Any strong mineral acid is the equivalent of the specified hydrochloric acid. For example, it is possible to use sulfuric or phosphoric acid. Other equivalents are the acid salts, such as sodium bisulfate and zinc chloride.

Furthermore, the expedient characteristic of Example 1, namely the acceleration of catalytic action by operation under superheated steam, may be employed in connection with any of the examples to follow involving the employment of catalysts other than the acids and acid salts.

The examples which follow are based on polymerization in the presence of air.

Example 2.—Dextrose: Neutral Salts: Magnesium Sulfate

With a suitable quantity of alpha anhydrous dextrose is blended 1%, by weight, of magnesium sulfate. The material is heated in an oven, or otherwise as may be found convenient, at a temperature of about 150° C. (302° F.) for one hour to melt the sugar and then for 5 hours to polymerize the same.

The product, analyzed by the isopropyl alcohol method, has characteristics as shown in the following table:

Table 2.—Dextrose: Magnesium Sulphate

| Isopropyl Alcohol Added to 15 cc. Polymer Solution to Give Alcohol Contents of— | Per cent Dextrose Polymer Precipitated on Total Dry Substance in Sample | Degree of Polymerization Indicated by Number of Dextrose Units |
|---|---|---|
| Cc. | Per cent | |
| 20 | 0 | 0 |
| 35 | 28 | 4.5 |
| 85 | 32 | 3.5 |
| | — | |
| | 60 | |

Any soluble neutral metal salt which does not decompose under operating conditions can be used as the equivalent of the magnesium sulfate of this example, for instance, barium perchlorate, sodium chloride, barium chloride, sodium sulfate, potassium sulfate, sodium bromide and potassium bromide.

Alkaline salts cannot be effectively used because of their tendency to break down or destroy dextrose. The neutral metal salt must be soluble in the molten dextrose. Any salt which is water soluble will presumably be soluble in molten dextrose since both water and molten dextrose have high dielectric constants.

The reason why a neutral salt is more effective than an acid, as a catalyst for polymerization, particularly in the case of more or less prolonged treatment, is perhaps due to the fact that the acid catalyst ultimately brings about some hydrolysis, when traces of water are present which is generally the case, so that its effectiveness is limited, after a certain period of time, while with a neutral salt polymerization takes place with little or no hydrolysis. That is, the acid catalyst generally involves, to some extent, equilibrium reactions while the reaction with the neutral salt is a one way reaction. The relative efficiency of such salt, in comparison with an acid or acid salt, may, however, depend on some specific characteristics of the substances under comparison. For example, cadmium sulfate is a neutral, water soluble salt which is relatively inefficient, possibly because the element cadmium has some sort of retarding effect on polymerization. Zinc chloride, an acid salt, appears to have greater efficiency as a polymerizing catalyst than magnesium sulfate, for example, due perhaps to the fact that the element zinc has a specific accelerating effect on polymerization separate and distinct from the general acid salt effect.

However, as a general rule the neutral metal salts give larger amounts and higher degrees of polymerization than acids or acid salts, and have a further advantage in that they do not bring about as much color formation per unit of time or per unit of temperature as do the acid or acid salt catalysts. In the case of neutral metal salt catalysts, the longer the duration of treatment the greater will be, proportionately, the amount and the degree of polymerization. This is not true of acid and acid salts because of the tendency to hydrolysis where acids are present, as stated above.

EXAMPLE 3.—DEXTROSE: BARIUM PERCHLORATE

With a suitable quantity of alpha anhydrous dextrose is blended 1% of barium perchlorate and the material then heated at 150° C. (302° F.) for six hours. The product had the characteristics, when analyzed by the isopropyl alcohol method, as indicated by the following table:

Table 3.—Dextrose: Barium Perchlorate

| Isopropyl Alcohol Added to 15 cc. Polymer Solution to Give Alcohol Contents of— | Per cent Dextrose Polymer Precipitated on Total Dry Substance in Sample | Degree of Polymerization Indicated by Number of Dextrose Units |
|---|---|---|
| Cc. | Per cent | |
| 20 | 11 | 9.0 |
| 35 | 23 | 5.9 |
| 85 | 35 | 3.7 |
| | 69 | |

Comparison of Table 3 with Table 2 indicates that the product of Example 3 has a larger amount of polymers and a higher degree of polymerization than the product of Example 2. That is, barium perchlorate appears to be a better catalyst for the reaction than magnesium sulfate.

If the polymerization treatment of Example 3 is increased from 5 to 50 hours, the amount and degree of polymerization are both considerably increased, as indicated by the following table:

Table 3-a.—Dextrose: barium perchlorate: prolonged treatment

| Isopropyl Alcohol Added to 15 cc. Polymer Solution to Give Alcohol Contents of— | Per cent Dextrose Polymer Precipitated on Total Dry Substance in Sample | Degree of Polymerization Indicated by Number of Dextrose Units |
|---|---|---|
| Cc. | Per cent | |
| 20 | 60 | 10.2 |
| 35 | 11 | 6.9 |
| 85 | 12 | 5.8 |
| | 83 | |

The striking thing about these figures is that they show that 60% of the polymer is precipitated in the 20 cc. solution which is an indication of a very high degree of polymerization.

It should be said that the figures in Table 3-a are estimated and not obtained by rigorously following the isopropyl alcohol analysis. They are believed to be approximately correct.

Any neutral metal perchlorate salt can be considered as the equivalent of barium perchlorate; for example, sodium and potassium perchlorate.

EXAMPLE 4.—DEXTROSE: ACETOCHLORO GLUCOSE

With a suitable quantity of alpha anhydrous dextrose is blended 0.2% of acetochloro glucose, and the material is heated for 6 hours (one hour for melting the dextrose and five for polymerizing the same) at a temperature of 150° C. (302° F.).

The product is superior in amount and degree of polymerization to products made under the same conditions but using hydrochloric acid as a catalyst.

EXAMPLE 5.—DEXTROSE: HYDROCHLORIC ACID AND BARIUM PERCHLORATE

With a suitable amount of alpha anhydrous dextrose is incorporated 0.015% (0.001% to 0.1%) of hydrogen chloride gas, as described in Example 1, and 1.0% (0.1% to 1.0%) of barium perchlorate. The material, after the sugar has been reduced to a molten state, is polymerized for five hours at 150° C. (302° F.). The product contains a larger percentage of dextrose polymers and the polymers have a higher degree of polymerization than where either catalyst is used alone under conditions otherwise the same as shown in the following table:

Table 5.—Dextrose: hydrochloric acid and barium perchlorate

| Isopropyl Alcohol Added to 15 cc. Polymer Solution to Give Alcohol Contents of— | Per cent Dextrose Polymer Precipitated on Total Dry Substance in Sample |
|---|---|
| Cc. | Per cent |
| 20 | 55 |
| 35 | 13 |
| 85 | 16 |
| | 84 |

The total polymerization is large and also the degree of polymerization as shown by the figure 55%.

EXAMPLE 6.—DEXTROSE: METABORIC ACID

With a suitable amount of alpha anhydrous dextrose is blended 1% of metaboric acid. The sugar is melted by placing the material in a vessel immersed in an oil bath heated to a temperature of 100° C. (212° F.) and raising the temperature of the bath to 155° C. (311° F.) in 25 minutes. The molten sugar is polymerized for 5 hours at 150° C. (302° F.). The product, analyzed by the isopropyl alcohol method, has characteristics as indicated by the following table:

Table 6.—Dextrose: metaboric acid

| Isopropyl Alcohol Added to 15 cc. Polymer Solution to Give Alcohol Contents of— | Per cent Dextrose Polymer Precipitated on Total Dry Substance in Sample |
|---|---|
| Cc. | Per cent |
| 20 | 0 |
| 35 | 25 |
| 85 | 40 |
| | 65 |

The amount and degree of polymerization are both greater than when hydrochloric acid is used as a catalyst.

In place of metaboric acid one can use boric anhydride or tetra- or orthoboric acid. Theoretically, because the process is intended to be carried on, so far as possible, under anhydrous conditions, boric anhydride should be used in preference to the other boron compounds. But for practical and economic reasons metaboric acid, containing only one molecule of water per molecule of boric anhydride, is to be preferred since it is readily available while boric anhydride and tetraboric acid (the latter containing a half molecule of water) are difficult to obtain and orthoboric acid contains too large a quantity of molecular water, i. e. three molecules, to make if desirable to use. In place of the boron compounds above referred to, one may use any other non-alkaline compound containing boric anhydride, i. e. $B_2O_3$.

EXAMPLE 7.—XYLOSE: METABORIC ACID

With a suitable quantity of xylose is blended 1% of metaboric acid, and the material is heated by means of an oil bath, as in Example 6, except that the temperature is raised from 100° C. to 160° C. (212° F. to 320° F.) in 30 minutes to melt the sugar. The molten sugar is then polymerized at 150° C. (302° F.) for five hours. The product contains a considerable amount of xylose polymers. This is indicated by the following table:

Table 7.—Xylose: metaboric acid

| Isopropyl Alcohol Added to 15 cc. Polymer Solution to Give Alcohol Contents of— | Per cent Xylose Polymer Precipitated on Total Dry Substance in Sample |
|---|---|
| Cc. | Per cent |
| 20 | 0 |
| 35 | 14 |
| 85 | 33 |
|  | — |
|  | 47 |

The results are better than with experiments made with heat alone or with heat and hydrochloric acid; the estimated amount of xylose polymers precipitated in the experiment with heat alone being 4%, and the corresponding amount of precipitate when heat and hydrochloric acid is used as a catalyst being 19%.

EXAMPLE 8.—MALTOSE: METABORIC ACID

The maltose is dehydrated (assuming the use of commercial maltose hydrate) and there is blended therewith 1% of metaboric acid. The material is first heated to melt the sugar, and is then polymerized at 150° C. (302° F.) for five hours. The character of the product of this example is indicated in the following table:

Table 8.—Maltose: metaboric acid

| Isopropyl Alcohol Added to 15 cc. Polymer Solution to Give Alcohol Contents of— | Per cent Maltose Polymer Precipitated on Total Dry Substance in Sample |
|---|---|
| Cc. | Per cent |
| 20 | 9 |
| 35 | 31 |
| 85 | 20 |
|  | — |
|  | 60 |

Heated at this temperature of 150° (302° F.) and using hydrochloric acid, the sugar is broken down and resinified, and the product is valueless. If molten maltose be blended with 1% of metaboric acid and heated at 100° C. (212° F.), some polymerization takes place, but less than at 150° C. (302° F.).

EXAMPLE 9.—MALTOSE: HYDROCHLORIC ACID

Powdered crystalline maltose hydrate is heated for 24 hours at 100° C. (212° F.) to dehydrate and melt the sugar. 0.005% of hydrogen chloride gas is incorporated with the sugar and the material heated for 5 hours at a temperature of 135°–140° C. (275°–284° F.). The product is light in color, being only slightly darker than the original sugar. Analyzed by the isopropyl alcohol method the material has characteristics as shown in the following table:

Table 9.—Maltose: hydrochloric acid

| Isopropyl Alcohol Added to 15 cc. Polymer Solution to Give Alcohol Contents of— | Per cent Maltose Polymer Precipitated on Total Dry Substance in Sample |
|---|---|
| Cc. | Per cent |
| 22 | 2 |
| 35 | 30 |
| 85 | 23 |
|  | — |
|  | 55 |

EXAMPLE 10.—LEVULOSE: METABORIC ACID

With a suitable quantity of levulose is blended 1% of metaboric acid and the material heated above the melting point of the levulose to reduce the mass to a molten state. It is then polymerized at 150° C. (302° F.) for five hours. The amount and degree of polymerization of the product are greater than when hydrochloric acid is used under conditions otherwise the same.

Because of the low melting point of levulose, this sugar when blended with the metaboric acid and the blend heated to reduce the sugar to a molten state, may be polymerized for 20 hours at 90° C. (194° F.) and give, by the isopropyl alcohol test, a polymer precipitate. Under the same conditions, except that hydrochloric acid is substituted for metaboric acid, no precipitate is obtainable.

EXAMPLE 11.—SUCROSE: METABORIC ACID

After blending 1% of metaboric acid with sucrose, the mix is heated in an oil bath, the temperature of which is raised from 100° C. (212° F.) to 170° C. (338° F.) during a period of 40 minutes. The material is then polymerized for five hours at 150° C. (302° F.). The amount and degree of polymerization is greater than when hydrochloric acid is used in place of metaboric acid as a catalyst, other conditions of the process being the same.

EXAMPLE 12.—SUCROSE: SODIUM CHLORIDE

With a suitable amount of sucrose is blended 1% of sodium chloride. The material is heated to melt the sugar and then polymerized for 5 hours at 150° C. (302° F.). The product shows a considerable amount and a fairly high degree of polymerization.

EXAMPLE 13—SUCROSE: BARIUM PERCHLORATE

With a suitable amount of sucrose is blended 1% of barium perchlorate, the sugar heated to melt it, and then polymerized for 5 hours at 150° C. (302° F.). The product shows a considerable amount and a fairly high degree of polymerization.

I claim:

1. The process of polymerizing sugars which comprises reducing the sugar to a molten state and heating the same under substantialy anhydrous conditions in contact with superheated steam, as a catalyst.

2. The process of polymerizing sugars which comprises incorporating with the sugar a mineral acid, as a catalyst, and heating the sugar under substantially anhydrous conditions at a polymerizing temperature above the melting point of the sugar but below the decomposition point thereof in contact with superheated steam, as a co-catalyst.

3. The process of polymerizing dextrose which comprises reducing dextrose to a molten state and heating the same under substantially anhydrous conditions in contact with superheated steam, as a catalyst.

4. The process of polymerizing dextrose which comprises incorporating with dextrose a mineral acid, as a catalyst, and heating the dextrose under substantially anhydrous conditions at a polymerizing temperature above the melting point of the sugar but below the decomposition point thereof in contact with superheated steam, as a co-catalyst.

5. The process of polymerizing dextrose which comprises incorporating with dextrose dry hydrogen chloride gas, reducing the dextrose to a molten state and heating the molten dextrose under substantially anhydrous conditions at a polymerizing temperature above the melting point of the dextrose but below the decomposition point thereof in contact with superheated steam, as a co-catalyst.

6. The process of polymerizing dextrose which comprises incorporating with dextrose metaboric acid, reducing the dextrose to a molten state and heating the molten dextrose under substantially anhydrous conditions at a polymerizing temperature above the melting point of the dextrose but below the decomposition point thereof in contact with superheated steam, as a co-catalyst.

7. The process of polymerizing xylose which comprises incorporating with xylose metaboric acid, reducing the xylose to a molten state and heating the molten xylose under substantially anhydrous conditions at a polymerizing temperature above the melting point of the xylose but below the decomposition point thereof in contact with superheated steam, as a co-catalyst.

8. The process of polymerizing maltrose which comprises incorporating with maltose metaboric acid, reducing the maltose to a molten state and heating the molten maltose under substantially anhydrous condition at a polymerizing temperature above the melting point of the maltose but below the decomposition point thereof in contact with superheated steam, as a co-catalyst.

9. The process of polymerizing dextrose which comprises incorporating with dextrose from 0.001% to 0.1% of dry hydrogen chloride gas; reducing the dextrose to a molten state; and heating the molten dextrose under substantially anhydrous conditions at a temperature of about 150° C. (302° F.) in anatmosphere of superheated steam.

10. The process of polymerizing dextrose which comprises blending with the dextrose about 1% of metaboric acid; reducing the blend to a molten state; and heating it under substantially anhydrous conditions for about 5 hours at a temperature of about 150° C. (302° F.) in an atmosphere of superheated steam.

11. The process of polymerizing maltose which comprises blending with the maltose about 1% of metaboric acid; reducing the blend to a molten state; and heating it under substantially anhydrous conditions for about 5 hours at a temperature of about 150° C. (302° F.) in an atmosphere of superheated steam.

12. The process of polymerizing xylose which comprises blending with the xylose about 1% of metaboric acid; reducing the blend to a molten state; and heating it under substantially anhydrous conditions for about 5 hours at a temperature of about 150° C. (302° F.) in an atmosphere of superheated steam.

13. The process of polymerizing maltose which comprises incorporating with dehydrated maltose about 0.005% of dry hydrogen chloride gas, and heating the material under substantially anhydrous conditions for about 5 hours at a temperature of about 135° C. to 140° C. (275° F. to 284° F.) in an atmosphere of superheated steam.

GERALD J. LEUCK.

REFERENCES CITED

The following references are of record in the file of this patent:

UNITED STATES PATENTS

| Number | Name | Date |
| --- | --- | --- |
| 2,027,904 | Farber | Jan. 12, 1936 |